United States Patent
Shmilovich et al.

(10) Patent No.: US 11,254,414 B2
(45) Date of Patent: Feb. 22, 2022

(54) AIRCRAFT WING DROOP LEADING EDGE APPARATUS AND METHODS

(71) Applicant: The Boeing Company, Chicago, IL (US)

(72) Inventors: Arvin Shmilovich, Huntington Beach, CA (US); Eric D. Dickey, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 115 days.

(21) Appl. No.: 16/849,096

(22) Filed: Apr. 15, 2020

(65) Prior Publication Data
US 2021/0323656 A1 Oct. 21, 2021

(51) Int. Cl.
*B64C 9/00* (2006.01)
*B64C 3/18* (2006.01)
*B64C 13/02* (2006.01)
*B64C 13/30* (2006.01)
*B64C 3/26* (2006.01)

(52) U.S. Cl.
CPC ............... *B64C 9/00* (2013.01); *B64C 3/185* (2013.01); *B64C 3/26* (2013.01); *B64C 13/02* (2013.01); *B64C 13/30* (2013.01)

(58) Field of Classification Search
CPC .. B64C 9/00; B64C 3/185; B64C 3/26; B64C 13/02; B64C 13/30; B64C 2003/445; B64C 3/48
See application file for complete search history.

(56) References Cited

U.S. PATENT DOCUMENTS

| | | | | |
|---|---|---|---|---|
| 4,252,287 A * | 2/1981 | Zimmer | .................... | B64C 3/48 244/214 |
| 8,534,611 B1 * | 9/2013 | Pitt | .......................... | B64C 3/50 244/214 |
| 9,944,356 B1 * | 4/2018 | Wigley | ..................... | B64C 9/00 |
| 2009/0302168 A1 * | 12/2009 | Hetrick | ..................... | B64C 3/52 244/214 |
| 2013/0264427 A1 * | 10/2013 | Hetrick | ..................... | B64C 3/50 244/215 |
| 2016/0009372 A1 * | 1/2016 | Grip | ......................... | B64C 9/24 244/214 |
| 2016/0185443 A1 * | 6/2016 | Rawdon | .................... | B64C 3/48 244/219 |
| 2019/0367156 A1 * | 12/2019 | Dickey | ..................... | B64C 9/22 |

* cited by examiner

*Primary Examiner* — Rodney A Bonnette
(74) *Attorney, Agent, or Firm* — Hanley, Flight & Zimmerman, LLC (57) ABSTRACT

Aircraft wing droop leading edge apparatus and methods are described. An example aircraft includes a wing having a front spar and an outer skin covering the front spar. The outer skin includes a forward portion located forward of the front spar. The forward portion of the outer skin includes a leading edge movable between a neutral position and a drooped position deflected downward relative to the neutral position. The forward portion of the outer skin has a continuous outer mold line when the leading edge is in the drooped position.

22 Claims, 7 Drawing Sheets

AIRCRAFT WING DROOP LEADING EDGE APPARATUS AND METHODS

FIELD OF THE DISCLOSURE

This disclosure relates generally to aircraft wings and, more specifically, to aircraft wing droop leading edge apparatus and methods.

BACKGROUND

Aircraft wings are commonly equipped with high-lift leading edge devices (e.g., slats, Krueger flaps, etc.) structured to enhance the lift coefficient associated with the airfoil of the wing. Conventional high-lift leading edge devices are movably coupled to a fixed portion of the wing, and are movable relative to the fixed portion of the wing between a stowed position and a deployed position. When deployed, a conventional high-lift leading edge device increases the effective camber of the wing and delays boundary layer separation, thereby increasing the maximum lift coefficient associated with the wing at higher angles of attack. Deployment of a conventional high-lift leading edge device typically facilitates improved handling of the aircraft at lower speeds (e.g., aircraft speeds of Mach 0.4 or less).

When a conventional high-lift leading edge device is used, at least a portion of the high-lift leading edge device is located forward of a fixed leading edge of the wing. During cruise when the leading edge device is in the stowed position there exists a discontinuity in the overall outer mold line of the wing, with the discontinuity being located between the stowed high-lift leading edge device and the fixed portion of the wing. Such discontinuities disrupt an otherwise smooth flow and can be disadvantageous with regard to aerodynamic characteristics of the wing and/or, more generally, with regard to operational and/or performance characteristics of the aircraft. This problem is particularly critical in the context of future airplanes equipped with laminar flow wings.

SUMMARY

Aircraft wing droop leading edge apparatus and methods are disclosed herein. In some examples, an aircraft is disclosed. In some disclosed examples, the aircraft comprises a wing including a front spar and an outer skin covering the front spar. In some disclosed examples, the outer skin has a forward portion located forward of the front spar. In some disclosed examples, the forward portion of the outer skin includes a leading edge movable between a neutral position and a drooped position deflected downward relative to the neutral position. In some disclosed examples, the forward portion of the outer skin has a continuous outer mold line when the leading edge is in the drooped position.

In some examples, a method is disclosed. In some disclosed examples, the method comprises moving a leading edge of a forward portion of an outer skin of a wing of an aircraft between a neutral position and a drooped position deflected downward relative to the neutral position. In some disclosed examples, the outer skin covers a front spar of the wing, and the forward portion of the outer skin is located forward of the front spar. In some disclosed examples, the forward portion of the outer skin has a continuous outer mold line when the leading edge is in the drooped position.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

When a conventional high-lift leading edge device is used, at least a portion of the high-lift leading edge device is located forward of a fixed leading edge of the wing. During cruise when the leading edge device is in the stowed position there exists a discontinuity in the overall outer mold line of the wing, with the discontinuity being located between the stowed high-lift leading edge device and the fixed portion of the wing. Such discontinuities disrupt an otherwise smooth flow and can be disadvantageous with regard to aerodynamic characteristics of the wing and/or, more generally, with regard to operational and/or performance characteristics of the aircraft. This problem is particularly critical in the context of future airplanes equipped with laminar flow wings.

As one example, discontinuities in the outer mold line of the wing resulting from the deployment of one or more conventional high-lift leading edge device(s) increase drag on the aircraft. The increase in drag has a negative economic impact on the operation of the aircraft. As another example, when a conventional high-lift leading edge device is used during takeoff, approach, and/or landing, at least a portion of the high-lift leading edge device is located forward of a fixed leading edge of the wing. The channel flow in the gapped region between the leading edge device and the wing is a source of noise. The increase in noise has a negative environmental impact in airport environments.

Example aircraft wing droop leading edge apparatus and methods disclosed herein include a deformable outer skin having a leading edge that is movable between a neutral position and a drooped position deflected downward relative to the neutral position. Unlike the conventional aircraft wing high-lift leading edge devices described above that provide discontinuities in the outer mold line of the wing (e.g., when such devices are stowed, and/or when such devices are deployed), the example aircraft wing droop leading edge apparatus and methods disclosed herein advantageously provide for an outer mold line of the wing that is and/or remains continuous (e.g., free of gaps and/or slots) throughout the full range of movement of the leading edge (e.g., between the neutral position and the drooped position).

The continuous outer mold line associated with the disclosed aircraft wing droop leading edge apparatus and methods eliminates a critical source of drag and/or noise associated with the conventional slotted high-lift leading edge devices described above. Consequently, a substantial reduction in the amount of drag on the aircraft is achieved, as is a substantial reduction in the amount of noise within and/or surrounding the aircraft. The reduction in drag advantageously provides a positive economic impact on the operation of the aircraft (e.g., by enabling the aircraft to achieve an improved lift-to-drag ratio and lower fuel burn). The reduction in noise advantageously provides a positive environmental impact on the operation of the aircraft. Additionally, in military applications, the continuous outer mold line associated with the disclosed aircraft wing droop leading edge apparatus and methods provides low observable properties that enhance survivability of the aircraft. The above-identified features as well as other advantageous features of the disclosed aircraft wing droop leading edge apparatus and methods are further described below in connection with the figures of the application.

Figure 1:
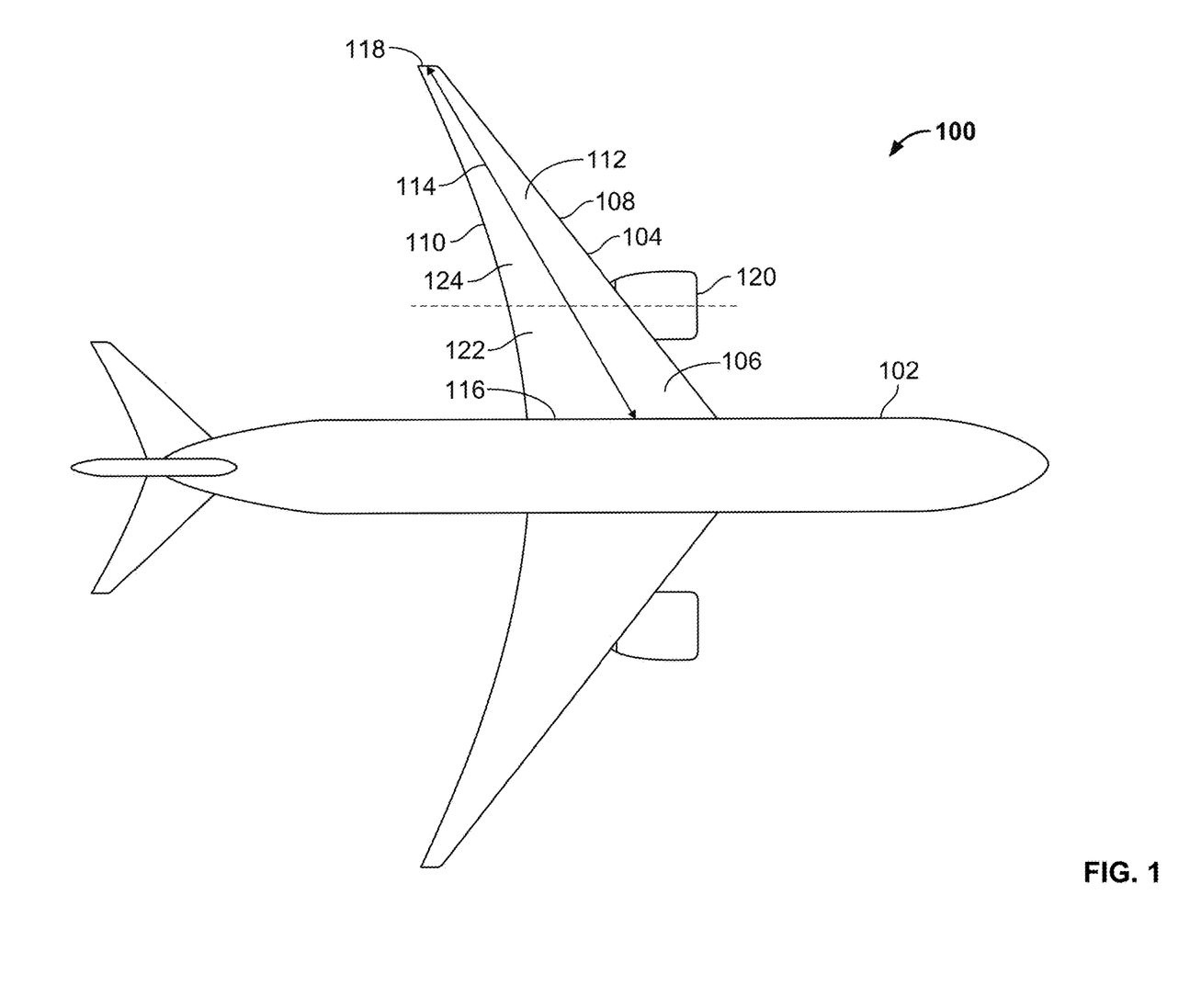
FIG. 1 illustrates an example aircraft in which a droop leading edge apparatus may be implemented in accordance with the teachings of this disclosure.

FIG. 1 illustrates an example aircraft 100 in which a droop leading edge apparatus may be implemented in accordance with the teachings of this disclosure. Although the aircraft 100 of FIG. 1 is a commercial aircraft, example droop leading edge apparatus disclosed herein can be implemented by and/or on any type of aircraft, including military aircraft (e.g., military transport aircraft, military fighter aircraft, etc.).

The aircraft 100 of FIG. 1 includes an example fuselage 102 and an example wing 104 coupled to the fuselage 102. While only a single wing (e.g., the wing 104) of the aircraft 100 is described herein, the aircraft 100 can include one or more additional wing(s) coupled to the fuselage 102, and structured in a manner that is substantially identical to the structure of the wing 104 as described herein. For example, the aircraft 100 can include a second wing coupled to the fuselage 102 at a location opposite that of the wing 104, and structured in a manner that is substantially identical to the structure of the wing 104 as described herein.

The wing 104 of FIG. 1 includes an example outer skin 106. The outer skin 106 and/or, more generally, the wing 104 of FIG. 1 includes an example leading edge 108, an example trailing edge 110 located opposite the leading edge 108, an example topside 112 extending between the leading edge 108 and the trailing edge 110, and an example underside (e.g., the underside 202 of FIG. 2) located opposite the topside 112 and extending between the leading edge 108 and the trailing edge 110. The outer skin 106 and/or, more generally, the wing 104 of FIG. 1 defines an example spanwise direction 114 extending between an example root 116 of the wing 104 and an example tip 118 of the wing 104. In the illustrated example of FIG. 1, the wing 104 is rearward-swept wing. In other examples, the wing 104 can alternatively be a straight (e.g., non-swept) wing or a forward-swept wing.

In the illustrated example of FIG. 1, the aircraft 100 further includes an example nacelle 120 coupled to the wing 104. The location of the nacelle 120 along the wing 104 partitions the wing 104 into in an example inboard section 122 and an example outboard section 124. The inboard section 122 of the wing 104 extends from the nacelle 120 inwardly to the root 116 of the wing 104. The outboard section 124 of the wing 104 extends from the nacelle 120 outwardly to the tip 118 of the wing 104. In other examples (e.g., in military fighter aircraft implementations), the aircraft 100 can alternatively be implemented with a wing 104 that does not include the nacelle 120.

Figure 2:
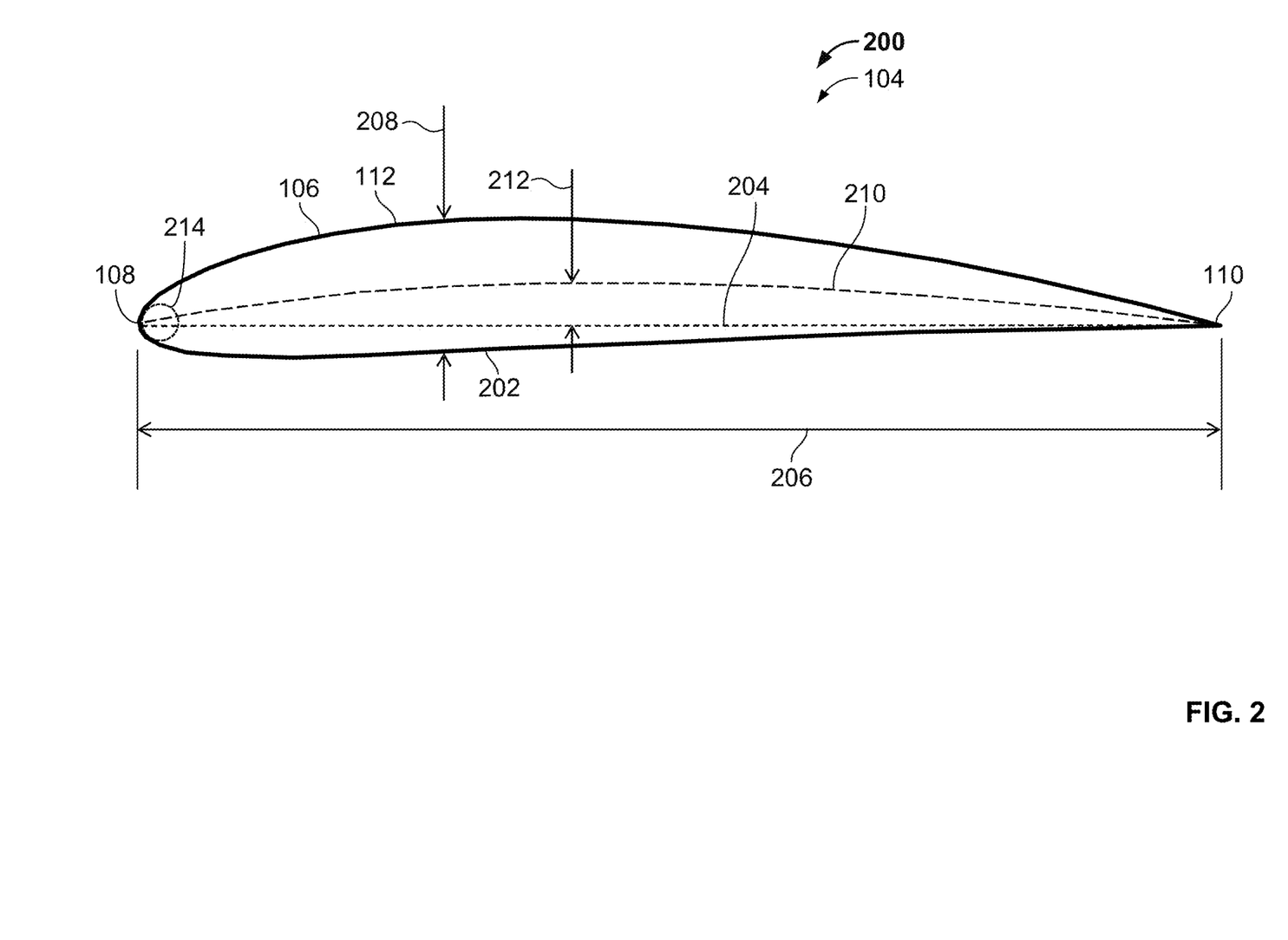
FIG. 2 illustrates an example airfoil of the wing of FIG. 1.

FIG. 2 illustrates an example airfoil 200 of the wing 104 of FIG. 1. As shown via the airfoil 200 of the wing 104 of FIGS. 1 and 2, the outer skin 106 and/or, more generally, the wing 104 includes the leading edge 108, the trailing edge 110, the topside 112, and an example underside 202, with the trailing edge 110 being located opposite the leading edge 108, the topside 112 extending between the leading edge 108 and the trailing edge 110, and the underside 202 being located opposite the topside 112 and extending between the leading edge 108 and the trailing edge 110.

As shown via the airfoil 200 of the wing 104 of FIGS. 1 and 2, the wing 104 includes and/or defines an example chord 204 extending between the leading edge 108 and the trailing edge 110, and having an example chord length 206. The wing 104 further includes and/or defines an example maximum thickness 208 extending between the topside 112 and the underside 202. The wing 104 further includes and/or defines an example mean camber line 210 extending between the leading edge 108 and the trailing edge 110, and having an example maximum camber 212 extending between the chord 204 and the mean camber line 210. The wing 104 further includes and/or defines an example leading edge radius of curvature 214 associated with the leading edge 108.

The airfoil 200 and/or, more generally, the wing 104 of the aircraft 100 of FIGS. 1 and 2 can be modified to include a droop leading edge apparatus constructed in accordance with the teachings of this disclosure. In some examples, when incorporating a droop leading edge apparatus as disclosed herein, the airfoil 200 and/or, more generally, the wing 104 of FIGS. 1 and 2 has: (1) a ratio of maximum thickness 208 to chord length 206 between five percent (5%) and twenty-five percent (25%); (2) a ratio of leading edge radius of curvature 214 to chord length 206 between one-half of a percent (0.5%) and six percent (6%); and (3) a ratio of maximum camber 212 to chord length 206 between zero percent (0%) and nine percent (9%).

Figure 3:
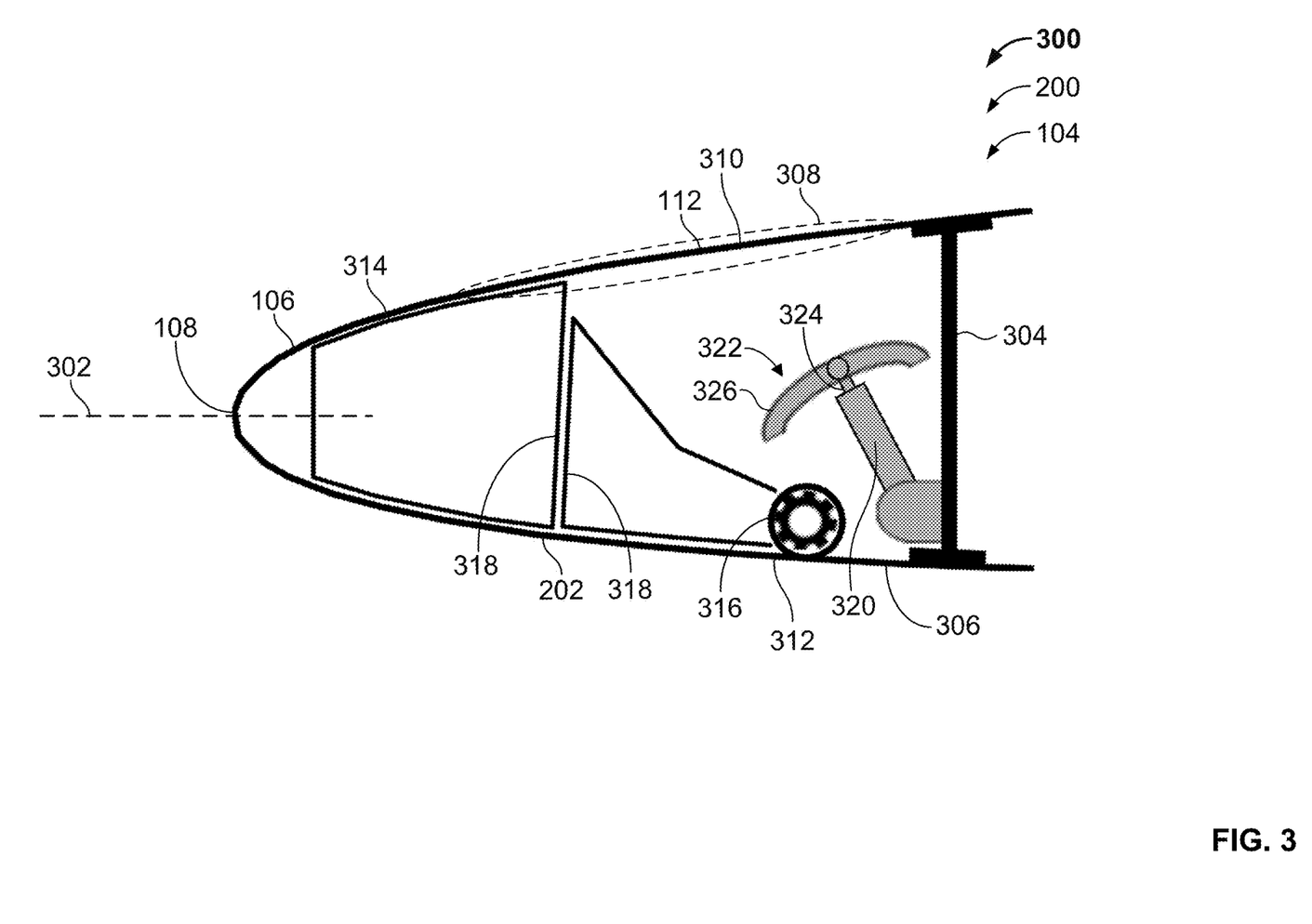
FIG. 3 illustrates an example forward portion of the airfoil of FIG. 2 with the leading edge of the wing in an example neutral position.
Figure 4:
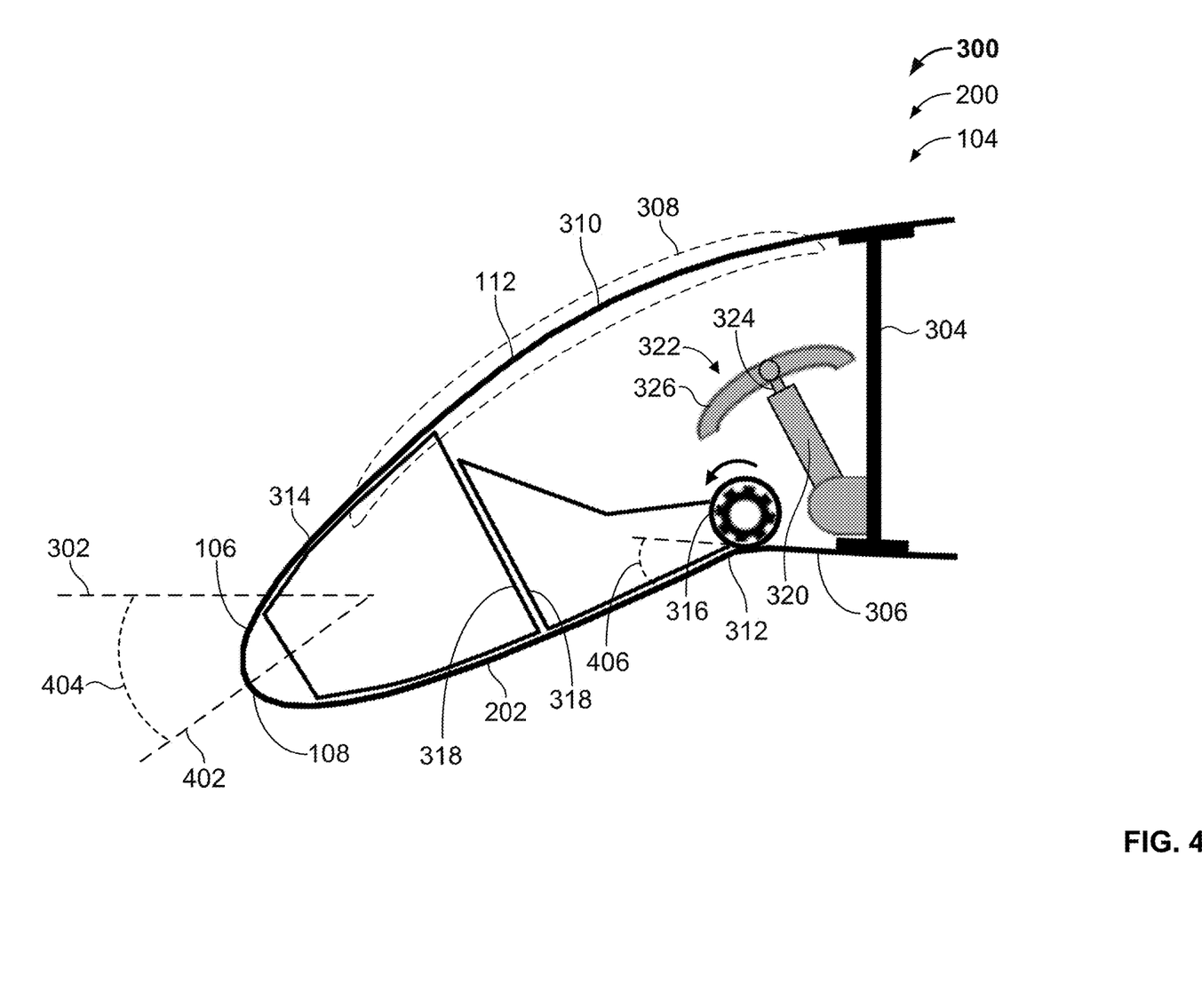
FIG. 4 illustrates the forward portion of the airfoil of FIG. 3 with the leading edge of the wing in an example drooped position.

FIGS. 3 and 4 illustrate an example forward section 300 of the airfoil 200 and/or, more generally, the wing 104 of FIGS. 1 and 2, modified to implement an example droop leading edge apparatus that facilitates moving the leading edge 108 of the wing 104 between a neutral position and a drooped position deflected downward relative to the neutral position. FIG. 3 illustrates the forward section 300 of the airfoil 200 and/or wing 104 with the leading edge 108 of the wing 104 in an example neutral position 302. FIG. 4 illustrates the forward section 300 of the airfoil 200 and/or wing 104 with the leading edge 108 of the wing 104 in an example drooped position 402.

As shown in FIG. 4, the drooped position 402 of the leading edge 108 of the wing 104 is deflected downward at an example deflection angle 404 of approximately thirty degrees) (30° relative to the neutral position 302 of the leading edge 108 of the wing 104. In some examples, the drooped position 402 and/or the deflection angle 404 of the leading edge 108 of the wing 104 shown in FIG. 4 corresponds to the maximum downward deflection of the leading edge 108 achievable via the droop leading edge apparatus. In other examples, the leading edge 108 can be deflected downward relative to the neutral position 302 of the leading edge 108 of the wing 104 to a drooped position having a substantially larger deflection angle 404 (e.g., 45°, 60°, 90°, etc.) compared to that shown in FIG. 4. In some examples, the leading edge 108 of the wing 104 can be moved, via the droop leading edge apparatus, to one of either the neutral position 302 of FIG. 3 or the drooped position 402 of FIG. 4. In other examples, the droop leading edge apparatus can additionally move the leading edge 108 of the wing 104 to, and/or maintain the leading edge 108 of the wing 104 at, any number of intermediate positions located between the neutral position 302 of FIG. 3 and the drooped position 402 of FIG. 4.

In the illustrated example of FIGS. 3 and 4, the forward section 300 of the airfoil 200 and/or wing 104 includes an example front spar 304 located within and/or covered by the outer skin 106 of the wing 104. The front spar 304 extends between and/or supports the topside 112 and the underside 202 of the outer skin 106, and further extends along the wing 104 in the spanwise direction 114 shown in FIG. 1. The forward section 300 of the airfoil 200 and/or wing 104 further includes an example forward portion 306 of the outer skin 106. The forward portion 306 of the outer skin 106 is located forward of and/or extends forward from the front spar 304, and includes the leading edge 108 along with the portions of the topside 112 and the underside 202 of the outer skin 106 extending between the leading edge 108 and the front spar 304.

The forward portion 306 of the outer skin 106 includes an example deformable portion 308 formed along and/or by the topside 112 of the outer skin 106 at a location between the leading edge 108 and the front spar 304. In some examples, the deformable portion 308 of the outer skin 106 can extend over the full chordwise span of the topside 112 of the outer skin 106 between the leading edge 108 and the front spar 304. In other examples, the deformable portion 308 of the outer skin 106 can instead extend over less than the full chordwise span of the topside 112 of the outer skin 106 between the leading edge 108 and the front spar 304, with the remaining portion of the topside 112 of the outer skin being non-deformable (e.g., rigid). In still other examples, the full span of the topside 112 of the outer skin 106 between the leading edge 108 and the front spar 304 can include multiple instances of the deformable portion 308 of the outer skin 106 separated and/or spaced apart by a non-deformable (e.g., rigid) portion of the outer skin 106.

In some examples, the deformable portion 308 of the outer skin 106 can extend in the spanwise direction 114 across and/or over the full length of the wing 104 (e.g., from the root 116 to the tip 118). In other examples, the deformable portion 308 of the outer skin 106 can extend in the spanwise direction 114 across and/or over a sub-section of the wing 104. For example, the deformable portion 308 of the outer skin 106 can extend in the spanwise direction 114 across and/or over the inboard section 122 of the wing 104, and/or some portion or segment thereof. As another example, the deformable portion 308 of the outer skin 106 can extend in the spanwise direction 114 across and/or over the outboard section 124 of the wing 104, and/or some portion or segment thereof.

The deformable portion 308 of the outer skin 106 can be formed from any type(s) and/or combination(s) of elastomeric materials, fiber-reinforced polymer materials, and/or carbon-reinforced polymer materials capable of being expanded, stretched, and/or otherwise deformed under the application of a mechanical force, with the deformable portion 308 returning to its initial contracted, unstretched, and/or undeformed shape upon removal of the application of the mechanical force. In the illustrated example of FIGS. 3 and 4, the deformable portion 308 of the outer skin 106 expands as the leading edge 108 of the wing 104 is moved (e.g., via an applied mechanical force) from the neutral position 302 of FIG. 3 to and/or toward the drooped position 402 of FIG. 4. Conversely, the deformable portion 308 of the outer skin 106 contracts as the leading edge 108 of the wing 104 is moved from the drooped position 402 of FIG. 4 to and/or toward the neutral position 302 of FIG. 3. The deformable portion 308 of the outer skin 106 has an example curvature 310 that changes as the deformable portion 308 expands and/or contracts. The curvature 310 of the deformable portion 308 of the outer skin 106 can be adjusted by the droop leading edge apparatus, as further described below.

The forward portion 306 of the outer skin 106 further includes an example hinged portion 312 formed along and/or by the underside 202 of the outer skin 106 at a location between the leading edge 108 and the front spar 304. In the illustrated example of FIGS. 3 and 4, the hinged portion 312 of the outer skin 106 is located closer to the front spar 304 than to the leading edge 108. In other examples, the hinged portion 312 of the outer skin 106 can instead be located approximately midway between the front spar 304 and the leading edge 108. In still other examples, the hinged portion 312 of the outer skin 106 can instead be located closer to the leading edge 108 than to the front spar 304.

In some examples, the hinged portion 312 of the outer skin 106 can extend in the spanwise direction 114 across and/or over the full length of the wing 104 (e.g., from the root 116 to the tip 118). In other examples, the hinged portion 312 of the outer skin 106 can extend in the spanwise direction 114 across and/or over a sub-section of the wing 104. For example, the hinged portion 312 of the outer skin 106 can extend in the spanwise direction 114 across and/or over the inboard section 122 of the wing 104, and/or some portion or segment thereof. As another example, the hinged portion 312 of the outer skin 106 can extend in the spanwise direction 114 across and/or over the outboard section 124 of the wing 104, and/or some portion or segment thereof. In some examples, the hinged portion 312 of the outer skin 106 extends in the spanwise direction 114 across and/or over the wing 104 to substantially the same extent with which the deformable portion 308 of the outer skin 106 extends in the spanwise direction 114 across and/or over the wing 104.

The hinged portion 312 of the outer skin 106 can be formed from any type(s) and/or combination(s) of elastomeric materials, fiber-reinforced polymer materials, and/or carbon-reinforced polymer materials capable of being bent under the application of a mechanical force, with the hinged portion 312 returning to its initial unbent shape upon removal of the application of the mechanical force. In the illustrated example of FIGS. 3 and 4, the hinged portion 312 of the outer skin 106 bends to an example deflection angle 406 as the leading edge 108 of the wing 104 is moved (e.g., via an applied mechanical force) from the neutral position 302 of FIG. 3 to and/or toward the drooped position 402 of FIG. 4. In some examples, the deflection angle 406 associated with the hinged portion 312 of the outer skin 106 corresponds directly to (e.g., matches) the deflection angle 404 associated with the drooped position 402 of the leading edge 108 of the wing 104.

The forward portion 306 of the outer skin 106 has an example outer mold line 314 formed by the leading edge 108, the portion of the topside 112 of the outer skin 106 extending between the leading edge 108 and the front spar 304 (e.g., including the deformable portion 308 of the outer skin 106), and the portion of the underside 202 of the outer skin 106 extending between the leading edge 108 and the front spar 304 (e.g., including the hinged portion 312 of the outer skin 106). The outer mold line 314 of the forward portion 306 of the outer skin 106 is continuous (e.g., free of discontinuities such as gaps and/or slots) when the leading edge 108 of the wing 104 is in the neutral position 302 shown in FIG. 3, as well as when the leading edge 108 of the wing 104 is in the drooped position 402 shown in FIG. 4. The existence of the continuous outer mold line 314 eliminates a critical source of drag and/or noise associated with the conventional gapped and/or slotted high-lift leading edge devices described above, thereby providing substantial reductions with respect to the amount of drag on the aircraft 100 as well as the amount of noise within and/or surrounding the aircraft 100.

The forward section 300 of the airfoil 200 and/or wing 104 further includes an example first actuator 316 structured to move the leading edge 108 of the wing 104 between the neutral position 302 of FIG. 3 and the drooped position 402 of FIG. 4. For example, the first actuator 316 can move the leading edge 108 of the wing 104 from the neutral position 302 of FIG. 3 to and/or toward the drooped position 402 of FIG. 4, whereby such movement causes the deformable portion 308 of the outer skin 106 of the wing 104 to expand (e.g., increase in length). Conversely, the first actuator 316 can move the leading edge 108 of the wing 104 from the drooped position 402 of FIG. 4 to and/or toward the neutral position 302 of FIG. 3, whereby such movement causes the deformable portion 308 of the outer skin 106 of the wing 104 to contract (e.g., decrease in length).

The first actuator 316 of FIGS. 3 and 4 can include any type(s) and/or number(s) of mechanical components including, for example, any type(s) and/or any number(s) of motors, valves, gears, clutches, latches, pistons, rods, shafts, links, pulleys, chains, belts, hinges, pins, biasing elements, shape memory alloys, etc. individually and/or collectively structured to transfer motion (e.g., rotational motion) from the first actuator 316 to the leading edge 108 of the wing 104. In some examples, motion from the first actuator 316 may be transferred to the leading edge 108 of the wing 104 via an example linkage assembly 318 operatively coupled to the first actuator 316 and to the forward portion 306 of the outer skin 106 of the wing 104.

In some examples, the first actuator 316 of FIGS. 3 and 4 can be implemented by and/or as an electro-mechanical actuation system that includes one or more electronic component(s) powered by an electrical power source located onboard the aircraft 100. In other examples, the first actuator 316 of FIGS. 3 and 4 can be implemented by and/or as a hydro-mechanical actuation system that includes one or more hydraulic component(s) powered by a hydraulic power source located onboard the aircraft 100. In still other examples, the first actuator 316 of FIGS. 3 and 4 can be implemented by and/or as a pneumatic-mechanical actuation system that includes one or more pneumatic component(s) powered by a pneumatic power source located onboard the aircraft 100.

In the illustrated example of FIGS. 3 and 4, the first actuator 316 is implemented by and/or as a rotary actuator (e.g., an electrically-powered rotary actuator, a hydraulically-powered rotary actuator, or a pneumatically-powered rotary actuator) structured to rotate the leading edge 108 of the wing 104 between the neutral position 302 of FIG. 3 and the drooped position 402 of FIG. 4. Rotational motion generated by the first actuator 316 is transferred to the leading edge 108 of the wing 104 via the linkage assembly 318, with the linkage assembly 318 being operatively coupled (e.g., mechanically coupled) to the first actuator 316 and to the forward portion 306 of the outer skin 106 of the wing 104.

In the illustrated example of FIGS. 3 and 4, the first actuator 316 is located forward of the front spar 304. In some examples, the first actuator 316 can be mechanically coupled to (e.g., mounted to) the front spar 304 such that the front spar 304 supports and/or carries the first actuator 316. In other examples, the first actuator 316 can alternatively be mechanically coupled to a support structure of the wing 104 other than the front spar 304. In some examples, the wing 104 includes a single instance of the first actuator 316, with the first actuator 316 being sized, powered, and/or otherwise configured to drive and/or move the leading edge 108 of the wing 104 between the neutral position 302 of FIG. 3 and the drooped position 402 of FIG. 4. In other examples, the wing 104 can alternatively include multiple instances of the first actuator 316 located in a spaced-apart manner along the spanwise direction 114 of the wing 104, with the multiple instances of the first actuator 316 being collectively sized, collectively powered, and/or otherwise collectively configured to drive and/or move the leading edge 108 of the wing 104 between the neutral position 302 of FIG. 3 and the drooped position 402 of FIG. 4.

Movements of the leading edge 108 of the wing 104 via the first actuator 316 are controlled based on (e.g., in response to) one or more command(s) and/or signal(s) received by and/or at the first actuator 316 from a first controller operatively coupled to the first actuator 316. In some examples, the first controller is a dedicated controller having command and/or control functionality for the first actuator 316. In other examples, the first controller may have general command and/or control functionality that is shared between the first actuator 316 and one or more other component(s) (e.g., a second actuator) of the wing 104, and/or, more generally, of the aircraft 100. In some examples, the first controller can be located within the forward section 300 of the wing 104. In other examples, the first controller can alternatively be located in a section of the wing 104 other then the forward section 300. In still other examples, the first controller can alternatively be located in a section of the aircraft 100 other than the wing 104 (e.g., in the fuselage 102 of the aircraft 100). An example first controller 602 is further described below in connection with FIG. 6.

In the illustrated example of FIGS. 3 and 4, movement of the leading edge 108 of the wing 104 from the neutral position 302 of FIG. 3 to and/or toward the drooped position 402 of FIG. 4 via the first actuator 316 (e.g., under the control of the first controller) increases the maximum camber 212 of the wing 104 and delays boundary layer separation, thereby increasing the maximum lift coefficient associated with the wing 104 at higher angles of attack. The first actuator 316 can advantageously move the leading edge 108 of the wing 104 from the neutral position 302 of FIG. 3 to and/or toward the drooped position 402 of FIG. 4 to facilitate improved handling of the aircraft 100 of FIG. 1 when the aircraft 100 is traveling at lower speeds (e.g., aircraft speeds of Mach 0.4 or less), as may occur during a takeoff operation, an approach operation, and/or a landing operation of the aircraft 100. Conversely, the first actuator 316 can move the leading edge 108 of the wing 104 from the drooped position 402 of FIG. 4 back to the neutral position 302 of FIG. 3 when the aircraft 100 of FIG. 1 is traveling at higher speeds (e.g., aircraft speeds of greater than Mach 0.4 or less), as may occur during a cruise operation of the aircraft 100.

Figure 5:
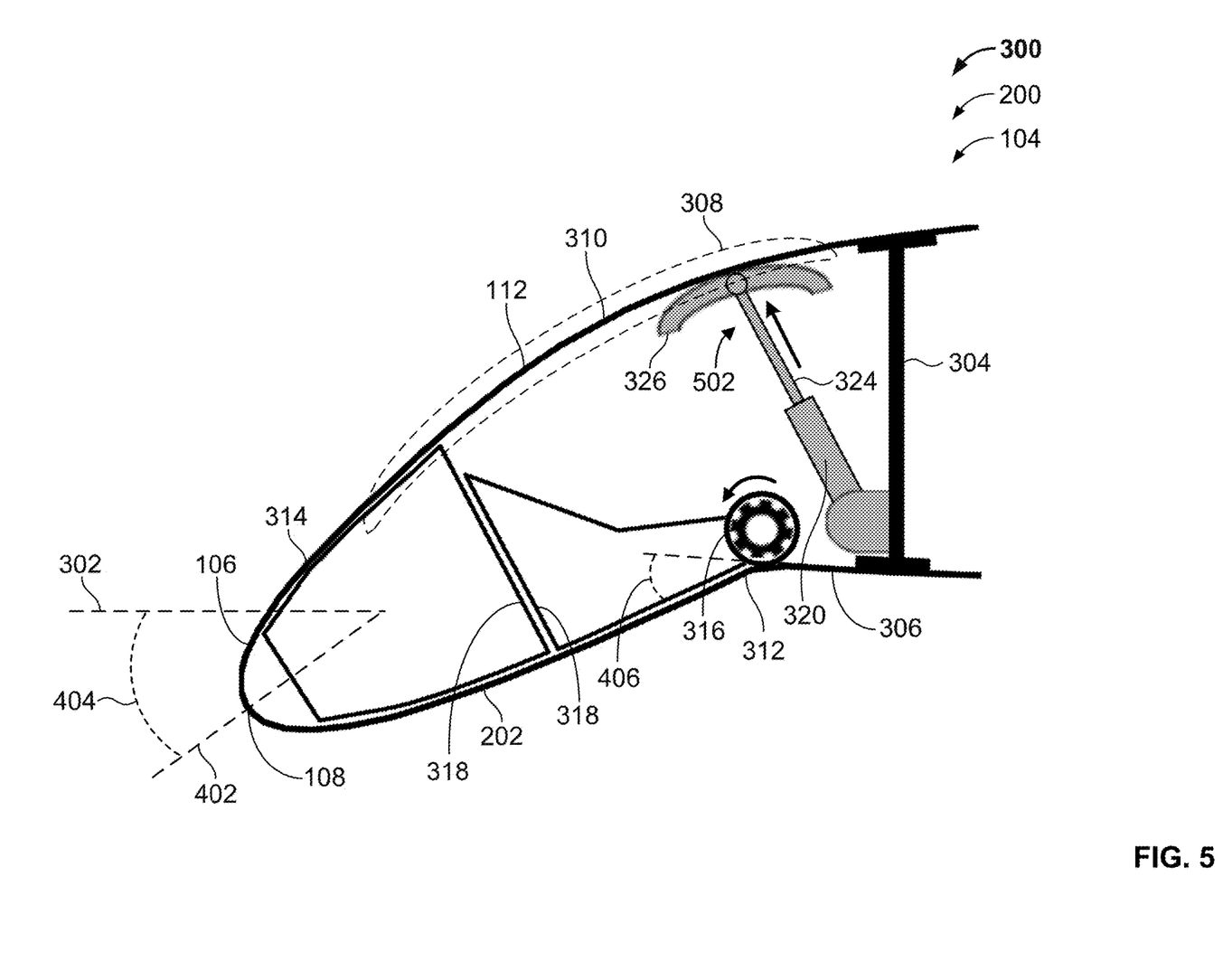
FIG. 5 illustrates the forward portion of the airfoil of FIGS. 3 and 4 with the leading edge of the wing in the drooped position of FIG. 4, and with the deformable portion of the outer skin of the wing engaged by the second actuator of FIGS. 3 and 4.

The forward section 300 of the airfoil 200 and/or wing 104 further includes an example second actuator 320 structured to adjust the curvature 310 of the deformable portion 308 of the outer skin 106 of the wing 104. For example, the second actuator 320 can adjust (e.g., increase, decrease, and/or otherwise reshape) the curvature 310 of the deformable portion 308 of the outer skin 106 of the wing 104 in association with the leading edge 108 of the wing 104 being moved from the neutral position 302 of FIG. 3 to and/or toward the drooped position 402 of FIG. 4. FIGS. 3 and 4 illustrate the second actuator 320 in an example retracted position 322 in which the second actuator 320 is not engaged with the deformable portion 308 of the outer skin 106 of the wing 104. FIG. 5 illustrates the second actuator 320 in an example extended position 502 in which the second actuator 320 is engaged with the deformable portion 308 of the outer skin 106 of the wing 104 to facilitate one or more adjustment(s) to the curvature 310 thereof via the second actuator 320.

In some examples, the second actuator 320 adjusts the curvature 310 of the deformable portion 308 of the outer skin 106 of the wing 104 to a desired (e.g., target) curvature subsequent to the first actuator 316 moving the leading edge 108 of the wing 104 to a desired (e.g., target) position. In some examples, the second actuator 320 adjusts the curvature 310 of the deformable portion 308 of the outer skin 106 of the wing 104 to a desired (e.g., target) curvature in parallel (e.g., concurrently) with the first actuator 316 moving the leading edge 108 of the wing 104 to a desired (e.g., target) position. Adjustments to the curvature 310 of the deformable portion 308 of the outer skin 106 via the second actuator 320 can advantageously be made to produce a desired flow state including, for example, production of a desired spanwise flow pattern across and/or over the wing 104 of the aircraft 100 in the spanwise direction 114. When multiple instances of the second actuator 320 are employed across and/or over the wing 104 of the aircraft 100 in the spanwise direction 114, individual and/or collective adjustments to the multiple instances of the second actuator 320 can be made to produce a smooth, span-varying, aerodynamic wing surface with full control of surface curvature.

The second actuator 320 of FIGS. 3-5 can include any type(s) and/or number(s) of mechanical components including, for example, any type(s) and/or any number(s) of motors, valves, gears, clutches, latches, pistons, rods, shafts, links, pulleys, chains, belts, hinges, pins, biasing elements, shape memory alloys, etc. individually and/or collectively structured to convert motion (e.g., translational motion) from the second actuator 320 into an adjustment of the curvature 310 of the deformable portion 308 of the outer skin 106 of the wing 104. In some examples, the second actuator 320 of FIGS. 3-5 can be implemented by and/or as an electro-mechanical actuation system that includes one or more electronic component(s) powered by an electrical power source located onboard the aircraft 100. In other examples, the second actuator 320 of FIGS. 3-5 can be implemented by and/or as a hydro-mechanical actuation system that includes one or more hydraulic component(s) powered by a hydraulic power source located onboard the aircraft 100. In still other examples, the second actuator 320 of FIGS. 3-5 can be implemented by and/or as a pneumatic-mechanical actuation system that includes one or more pneumatic component(s) powered by a pneumatic power source located onboard the aircraft 100.

In the illustrated example of FIGS. 3-5, the second actuator 320 is implemented by and/or as a linear actuator (e.g., an electrically-powered linear actuator, a hydraulically-powered linear actuator, or a pneumatically-powered linear actuator) having an example extendible shaft 324 and an example cap 326 coupled to the extendible shaft 324. The cap 326 has a curved profile that is engageable with the deformable portion 308 of the outer skin 106 of the wing 104 when the extendible shaft 324 of the second actuator 320 is extended from the retracted position 322 of FIGS. 3 and 4 into the extended position 502 of FIG. 5. In some examples, the cap 326 of the second actuator 320 is pivotably coupled to the extendible shaft 324 of the second actuator 320 and is freely pivotable relative thereto. In other examples, the cap 326 of the second actuator 320 is pivotably coupled to the extendible shaft 324 of the second actuator 320, and is pivotable and/or rotatable relative thereto in a controlled manner, as further described below. In still other examples, the cap 326 of the second actuator 320 is rigidly coupled to the extendible shaft 324 of the second actuator 320, and is not pivotable relative thereto.

In the illustrated example of FIGS. 3-5, the second actuator 320 is located forward of the front spar 304. In some examples, the second actuator 320 can be mechanically coupled to (e.g., mounted to) the front spar 304 such that the front spar 304 supports and/or carries the second actuator 320. In other examples, the second actuator 320 can alternatively be mechanically coupled to a support structure of the wing 104 other than the front spar 304. In some examples, the wing 104 includes a single instance of the second actuator 320, with the second actuator 320 being sized, powered, and/or otherwise configured to control and/or adjust the curvature 310 of the deformable portion 308 of the outer skin 106 of the wing 104. In other examples, the wing 104 can alternatively include multiple instances of the second actuator 320 located in a spaced-apart manner along the spanwise direction 114 of the wing 104, with the multiple instances of the second actuator 320 being collectively sized, collectively powered, and/or otherwise collectively configured to adjust the curvature 310 of the deformable portion 308 of the outer skin 106 of the wing 104.

Adjustments to the curvature 310 of the deformable portion 308 of the outer skin 106 of the wing 104 via the second actuator 320 are controlled based on (e.g., in response to) one or more command(s) and/or signal(s) received by and/or at the second actuator 320 from a second controller operatively coupled to the second actuator 320. In some examples, the second controller is a dedicated controller having command and/or control functionality for the second actuator 320. In other examples, the second controller may have general command and/or control functionality that is shared between the second actuator 320 and one or more other component(s) (e.g., the first actuator 316) of the wing 104 and/or, more generally, of the aircraft 100. In some examples, the second controller can be located within the forward section 300 of the wing 104. In other examples, the second controller can alternatively be located in a section of the wing 104 other then the forward section 300. In still other examples, the second controller can alternatively be located in a section of the aircraft 100 other than the wing 104 (e.g., in the fuselage 102 of the aircraft 100). An example second controller 604 is further described below in connection with FIG. 6.

As an alternative to being commanded by a controller, the second actuator 320 can instead be mechanically slaved (e.g., mechanically linked) to the first actuator 316 such that the curvature 310 of the deformable portion 308 of the outer skin 106 of the wing 104 is automatically adjusted (e.g., in a forced manner) by the second actuator 320 based on the first actuator 316 moving the leading edge 108 of the wing 104. Mechanically slaving the second actuator 320 to the first actuator 316 advantageously eliminates any need for a controller to command the second actuator 320 to adjust the curvature 310 of the deformable portion 308 of the outer skin 106 of the wing 104.

The wing 104 can include any number of instances of the first actuator 316 and the second actuator 320 configured in any spatial arrangement and/or spatial distribution within the wing 104. For example, the spanwise location of the second actuator 320 (e.g., the location of the second actuator 320 along the spanwise direction 114 of the wing 104) can differ from the spanwise location of the first actuator 316. As another example, the spanwise location of the second actuator 320 can be substantially the same as the spanwise location of the first actuator 316. As another example, one or more instances of the second actuator 320 can be located between two neighboring instances of the first actuator 316 along the spanwise direction 114 of the wing 104. As another example, one or more instances of the first actuator 316 can be located between two neighboring instances of the second actuator 320 along the spanwise direction 114 of the wing 104. As another example, the wing 104 can include alternating instances of the first actuator 316 and the second actuator 320 spaced apart from one another along the spanwise direction 114 of the wing 104.

Figure 6:
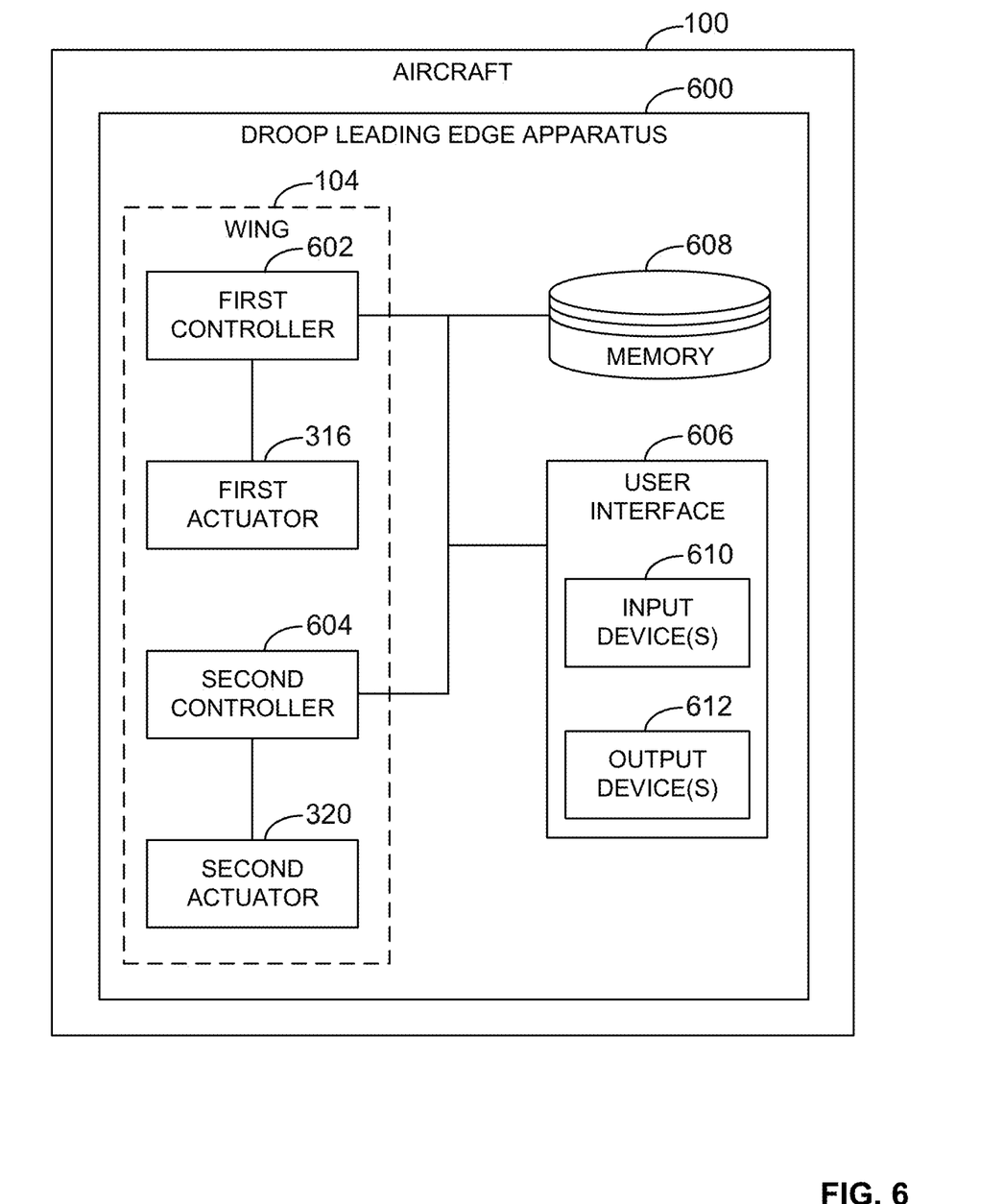
FIG. 6 is a block diagram of an example droop leading edge control system to be implemented in connection with the aircraft of FIGS. 1-5.

FIG. 6 is a block diagram of an example droop leading edge control system 600 to be implemented in connection with the aircraft 100 of FIGS. 1-5. The droop leading edge control system 600 of FIG. 6 includes the first actuator 316 and the second actuator 320 of FIGS. 3-5 described above, and further includes an example first controller 602, an example second controller 604, an example user interface 606, and an example memory 608. In the illustrated example of FIG. 6, the first controller 602 is operatively coupled to the first actuator 316, the second controller 604, the user interface 606, and the memory 608. The second controller 604 is operatively coupled to the second actuator 320, the first controller 602, the user interface 606, and the memory 608. The user interface 606 is operatively coupled to the first controller 602, the second controller 604, and the memory 608. The memory 608 is operatively coupled to the first controller 602, the second controller 604, and the user interface 606. However, other example implementations of the droop leading edge control system 600 of FIG. 6 may include fewer or additional mechanical and/or operative couplings between and/or among the structures of the droop leading edge control system 600.

In the illustrated example of FIG. 6, the first controller 602 is separate and/or distinct from the second controller 604. In other examples, the first controller 602 and the second controller 604 can alternatively be implemented via a single combined (e.g., integrated) controller operatively coupled to both the first actuator 316 and the second actuator 320. Furthermore, although the first controller 602 and the second controller 604 are respectively shown in FIG. 6 as being located within the wing 104 of the aircraft 100, the first controller 602 and/or the second controller 604 can alternatively be located within and/or on a section of the aircraft 100 other than the wing 104 (e.g., within and/or on the fuselage 102 of the aircraft 100).

In the illustrated example of FIG. 6, the first controller 602 is a dedicated controller having command and/or control functionality over the first actuator 316, and the second controller 604 is a dedicated controller having command and/or control functionality over the second actuator 320. In other examples, the first controller 602 may have general command and/or control functionality that is shared between the first actuator 316 and the second actuator 320, and/or the second controller 604 may have general command and/or control functionality that is shared between the second actuator 320 and the first actuator 316.

The first controller 602 of FIG. 6 can be implemented by any type(s) and/or any number(s) of processor(s), microprocessor(s), controller(s), microcontroller(s), transmitter(s), receiver(s), circuit(s) and/or other electrical component(s). The first controller 602 controls and/or manages one or more operation(s) of the first actuator 316, the second controller 604, the user interface 606, and/or the memory 608 based on data, commands, and/or signals received at the first controller 602 from the first actuator 316, the second controller 604, the user interface 606, and/or the memory 608, and/or based on data, commands, and/or signals transmitted from the first controller 602 to the first actuator 316, the second controller 604, the user interface 606, and/or the memory 608.

The first controller 602 commands the first actuator 316 to move the leading edge 108 of the wing 104 between the neutral position 302 of FIG. 3 and the drooped position 402 of FIG. 4. For example, the first controller 602 can command the first actuator 316 to move the leading edge 108 of the wing 104 from the neutral position 302 of FIG. 3 to and/or toward the drooped position 402 of FIG. 4. As another example, the first controller 602 can command the first actuator 316 to move the leading edge 108 of the wing 104 from the drooped position 402 of FIG. 4 to and/or toward the neutral position 302 of FIG. 3. As another example, the first controller 602 can command the first actuator 316 to move the leading edge 108 of the wing 104 to and/or from an intermediate position located between the neutral position 302 of FIG. 3 and the drooped position 402 of FIG. 4.

The first controller 602 of FIG. 6 commands the first actuator 316 to move the leading edge 108 of the wing 104 between the neutral position 302 of FIG. 3 and the drooped position 402 of FIG. 4 based on position control data received, accessed, processed, and/or generated by the first controller 602. The position control data indicates, corresponds to, and/or constitutes a desired (e.g., target) position of the leading edge 108 of the wing 104 of the aircraft 100. In some examples, the first controller 602 receives the position control data from the user interface 606 of the droop leading edge control system 600 of FIG. 6. In other examples, the first controller 602 accesses the position control data from the memory 608 of the droop leading edge control system 600 of FIG. 6.

The second controller 604 of FIG. 6 can be implemented by any type(s) and/or any number(s) of processor(s), microprocessor(s), controller(s), microcontroller(s), transmitter(s), receiver(s), circuit(s) and/or other electrical component(s). The second controller 604 controls and/or manages one or more operation(s) of the second actuator 320, the first controller 602, the user interface 606, and/or the memory 608 based on data, commands, and/or signals received at the second controller 604 from the second actuator 320, the first controller 602, the user interface 606, and/or the memory 608, and/or based on data, commands, and/or signals transmitted from the second controller 604 to the second actuator 320, the first controller 602, the user interface 606, and/or the memory 608.

The second controller 604 commands the second actuator 320 to adjust the curvature 310 of the deformable portion 308 of the outer skin 106 of the wing 104. For example, the second controller 604 can command the second actuator 320 to engage the deformable portion 308 of the outer skin 106 of the wing 104 with a pressure and/or a force sufficient to adjust the curvature 310 thereof to a desired (e.g., target) curvature. More specifically, the second controller 604 can command the extendible shaft 324 of the second actuator 320 to extend to a desired position (e.g., the extended position 502 of FIG. 5) such that the cap 326 of the second actuator 320 engages the deformable portion 308 of the outer skin 106 of the wing 104 with a pressure and/or a force sufficient to adjust the curvature 310 thereof to a desired (e.g., target) curvature. In implementations of the second actuator 320 wherein the cap 326 is controllably pivotable relative to the extendible shaft 324, the second controller 604 can additionally or alternatively command the cap 326 to pivot (e.g., to rotate) to a desired (e.g., target) position relative to the extendible shaft 324 such that the cap 326 engages the deformable portion 308 of the outer skin 106 of the wing 104 with a pressure and/or a force sufficient to adjust the curvature 310 thereof to a desired (e.g., target) curvature.

The second controller 604 of FIG. 6 commands the second actuator 320 to adjust the curvature 310 of the deformable portion 308 of the outer skin 106 of the wing 104 based on curvature control data received, accessed, processed, and/or generated by the second controller 604. The curvature control data indicates, corresponds to, and/or constitutes a desired (e.g., target) curvature of the deformable portion 308 of the outer skin 106 of the wing 104 of the aircraft 100. In some examples, the second controller 604 receives the curvature control data from the user interface 606 of the droop leading edge control system 600 of FIG. 6. In other examples, the first controller 602 accesses the curvature control data from the memory 608 of the droop leading edge control system 600 of FIG. 6.

The user interface 606 of FIG. 6 facilitates interactions and/or communications between an end user (e.g., a pilot of the aircraft 100 of FIG. 1) and the first controller 602, the second controller 604, the memory 608, and/or, more generally, the droop leading edge control system 600. Data and/or information that is received from and/or presented by the user interface 606 of FIG. 6 may be of any quantity, type, form and/or format, and may be stored in a computer-readable storage medium such as the example memory 608 of FIG. 6 described below.

The user interface 606 of FIG. 6 includes one or more example input device(s) 610 via which the user may input data, information, and/or commands to the first controller 602, the second controller 604, and/or the memory 608 of the droop leading edge control system 600. For example, the input device(s) 610 can include a control lever, a button, a knob, a switch, a touchscreen, an audio sensor, a microphone, and/or a camera that enable(s) the user to convey data, information, and/or commands to the first controller 602, the second controller 604, and/or the memory 608 of the droop leading edge control system 600.

In some examples, data, information, and/or commands input via the input device(s) 610 of the user interface 606 may indicate, correspond to, and/or constitute position control data associated with a desired (e.g., target) position of the leading edge 108 of the wing 104 of the aircraft 100. In other examples, data, information, and/or commands input via the input device(s) 610 of the user interface 606 may additionally or alternatively indicate, correspond to, and/or constitute curvature control data associated with a desired (e.g., target) curvature of the deformable portion 308 of the outer skin 106 of the wing 104 of the aircraft 100.

The user interface 606 of FIG. 6 also includes one or more example output device(s) 612 via which the user interface 606 presents data and/or information in visual and/or audible form to the user. For example, the output device(s) 612 may include a light emitting diode, a touchscreen, and/or a liquid crystal display for presenting visual data and/or information, and/or a speaker for presenting audible data and/or information.

In some examples, data and/or information presented via the output device(s) 612 of the user interface 606 may indicate, correspond to, and/or constitute a current (e.g., actual and/or measured) position of the leading edge 108 of the wing 104 of the aircraft 100. In other examples, data and/or information presented via the output device(s) 612 of the user interface 606 may additionally or alternatively indicate, correspond to, and/or constitute a current (e.g., actual and/or measured) curvature of the deformable portion 308 of the outer skin 106 of the wing 104 of the aircraft 100.

The memory 608 of FIG. 6 can be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 608 of FIG. 6 may be stored in any file and/or data structure format, organization scheme, and/or arrangement. The memory 608 of FIG. 6 is accessible to the first controller 602, the second controller 604, and/or the user interface 606 (including the input device(s) 610 and the output device(s) 612) of FIG. 6, and/or, more generally, to the droop leading edge control system 600 of FIG. 6.

In some examples, the memory 608 of FIG. 6 stores position control data accessed, processed and/or generated by and/or at the first controller 602 of FIG. 6. In some examples, the memory 608 of FIG. 6 stores curvature control data accessed, processed and/or generated by and/or at the second controller 604 of FIG. 6. In some examples, the memory 608 of FIG. 6 stores desired (e.g., target) position data and/or desired (e.g., target) curvature data received from the input device(s) 610 of the user interface 606 of FIG. 6. In some examples, the memory 608 of FIG. 6 stores current (e.g., actual and/or measured) position data and/or current (e.g., actual and/or measured) curvature data presented via the output device(s) 612 of the user interface 606 of FIG. 6.

While an example manner of implementing the droop leading edge control system 600 is illustrated in FIG. 6, one or more of the elements, processes and/or devices illustrated in FIG. 6 may be combined, divided, re-arranged, omitted, eliminated and/or implemented in any other way. Further, the first actuator 316, the second actuator 320, the first controller 602, the second controller 604, the user interface 606, the memory 608, and/or, more generally, the droop leading edge control system 600 of FIG. 6 may be implemented by hardware, software, firmware and/or any combination of hardware, software and/or firmware. Thus, for example, any of the first actuator 316, the second actuator 320, the first controller 602, the second controller 604, the user interface 606, the memory 608, and/or, more generally, the droop leading edge control system 600 of FIG. 6 could be implemented by one or more analog or digital circuit(s), logic circuit(s), programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the first actuator 316, the second actuator 320, the first controller 602, the second controller 604, the user interface 606, the memory 608, and/or, more generally, the droop leading edge control system 600 of FIG. 6 is/are hereby expressly defined to include a non-transitory computer-readable storage device or storage disk such as a memory, a digital versatile disk (DVD), a compact disk (CD), a Blu-ray disk, etc. including the software and/or firmware. Further still, the first actuator 316, the second actuator 320, the first controller 602, the second controller 604, the user interface 606, the memory 608, and/or, more generally, the droop leading edge control system 600 of FIG. 6 may include one or more element(s), process(es) and/or device(s) in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary component(s), and does not require direct physical (e.g., wired) communication and/or constant communication, but rather additionally includes selective communication at periodic intervals, scheduled intervals, aperiodic intervals, and/or one-time events.

Figure 7:
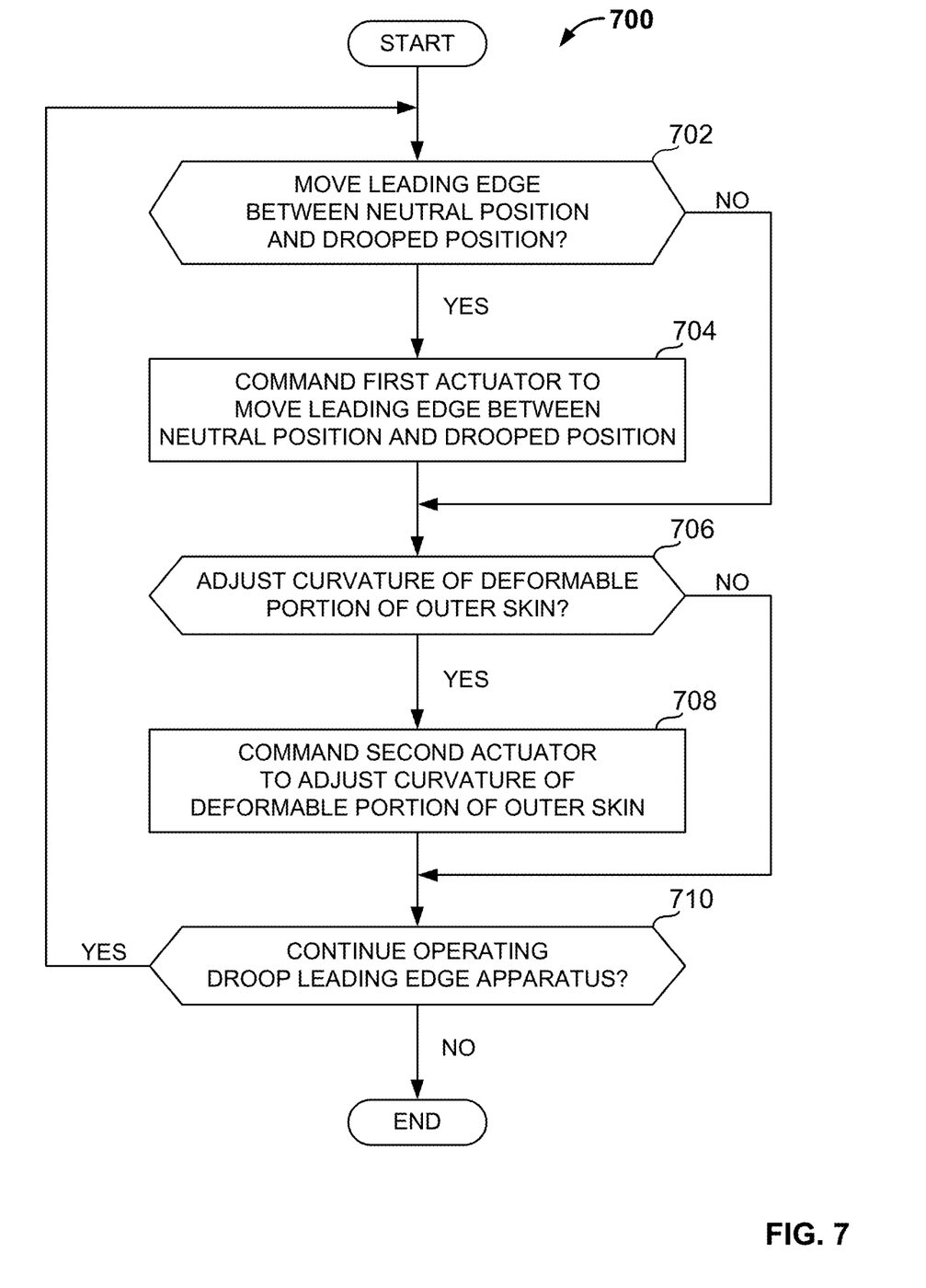
FIG. 7 is a flowchart representative of an example method that may be performed via the droop leading edge control system of FIG. 6.

A flowchart representative of example hardware logic, machine-readable instructions, hardware implemented state machines, and/or any combination thereof for implementing the example droop leading edge control system 600 of FIG. 6 is shown in FIG. 7. The machine-readable instructions may be one or more executable program(s) or portion(s) of executable program(s) for execution by a computer processor as may be implemented by the first controller 602 and/or the second controller 604 of the droop leading edge control system 600. The program(s) may be embodied in software stored on a non-transitory computer-readable storage medium such as a CD-ROM, a floppy disk, a hard drive, a DVD, a Blu-ray disk, or a memory associated with the processor, but the entire program(s) and/or parts thereof could alternatively be executed by a device other than the processor and/or embodied in firmware or dedicated hardware. Further, although the example program(s) is/are described with reference to the flowchart illustrated in FIG. 7, many other methods of implementing the example droop leading edge control system 600 of FIG. 6 may alternatively be used. For example, the order of execution of the blocks may be changed, and/or some of the blocks described may be changed, eliminated, or combined. Additionally or alternatively, any or all of the blocks may be implemented by one or more hardware circuit(s) (e.g., discrete and/or integrated analog and/or digital circuitry, a field-programmable gate array (FPGA), an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a packaged format, etc. Machine-readable instructions as described herein may be stored as data (e.g., portions of instructions, code, representations of code, etc.) that may be utilized to create, manufacture, and/or produce machine-executable instructions. For example, the machine-readable instructions may be fragmented and stored on one or more storage device(s) and/or computing device(s) (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

As mentioned above, the example processes of FIG. 7 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer-readable medium" is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 7 is a flowchart representative of an example method 700 that may be performed via the droop leading edge control system 600 of FIG. 6. The method 700 of FIG. 7 begins when the first controller 602 of the droop leading edge control system 600 of FIG. 6 determines whether to move the leading edge 108 of the wing 104 between the neutral position 302 of FIG. 3 and the drooped position 402 of FIG. 4 (block 702). For example, the first controller 602 can determine to move the leading edge 108 of the wing 104 between the neutral position 302 of FIG. 3 and the drooped position 402 of FIG. 4 in response to receiving data, information, and/or one or more command(s) (e.g., input via the input device(s) 610 of the user interface 606 of FIG. 6) indicating, corresponding to, and/or constituting position control data associated with a desired (e.g., target) position of the leading edge 108 of the wing 104 that differs from a current (e.g., actual and/or measured) position of the leading edge 108 of the wing 104. If the first controller 602 determines at block 702 to move the leading edge 108 of the wing 104 between the neutral position 302 and the drooped position 402, the method 700 of FIG. 7 proceeds to block 704. If the first controller 602 instead determines at block 702 not to move the leading edge 108 of the wing 104 between the neutral position 302 and the drooped position 402, the method 700 of FIG. 7 proceeds to block 706.

At block 704, the first controller 602 commands the first actuator 316 of the droop leading edge control system 600 to move the leading edge 108 of the wing 104 between the neutral position 302 of FIG. 3 and the drooped position 402 of FIG. 4. For example, the first controller 602 can command the first actuator 316 to move the leading edge 108 of the wing 104 from the neutral position 302 of FIG. 3 to and/or toward the drooped position 402 of FIG. 4. As another example, the first controller 602 can command the first actuator 316 to move the leading edge 108 of the wing 104 from the drooped position 402 of FIG. 4 to and/or toward the neutral position 302 of FIG. 3. As another example, the first controller 602 can command the first actuator 316 to move the leading edge 108 of the wing 104 to and/or from an intermediate position located between the neutral position 302 of FIG. 3 and the drooped position 402 of FIG. 4.

In some examples, the command(s) issued by the first controller 602 at block 704 are based on position control data received, accessed, processed, and/or generated by the first controller 602, wherein the position control data indicates, corresponds to, and/or constitutes a desired (e.g., target) position of the leading edge 108 of the wing 104 of the aircraft 100. In some examples, the first controller 602 receives the position control data from the user interface 606 of the droop leading edge control system 600 of FIG. 6. In other examples, the first controller 602 accesses the position control data from the memory 608 of the droop leading edge control system 600 of FIG. 6. Following block 704, the method 700 of FIG. 7 proceeds to block 706.

At block 706, the second controller 604 of the droop leading edge control system 600 of FIG. 6 determines whether to adjust the curvature 310 of the deformable portion 308 of the outer skin 106 of the wing 104. For example, the second controller 604 can determine to adjust the curvature 310 of the deformable portion 308 of the outer skin 106 of the wing 104 in response in response to receiving data, information, and/or one or more command(s) (e.g., input via the input device(s) 610 of the user interface 606 of FIG. 6) indicating, corresponding to, and/or constituting curvature control data associated with a desired (e.g., target) curvature of the deformable portion 308 of the outer skin 106 of the wing 104 that differs from a current (e.g., actual and/or measured) curvature of the deformable portion 308 of the outer skin 106 of the wing 104. If the second controller 604 determines at block 706 to adjust the curvature 310 of the deformable portion 308 of the outer skin 106 of the wing 104, the method 700 of FIG. 7 proceeds to block 708. If the second controller 604 instead determines at block 706 not to adjust the curvature 310 of the deformable portion 308 of the outer skin 106 of the wing 104, the method 700 of FIG. 7 proceeds to block 710.

At block 708, the second controller 604 commands the second actuator 320 of the droop leading edge control system 600 to adjust the curvature 310 of the deformable portion 308 of the outer skin 106 of the wing 104. For example, the second controller 604 can command the second actuator 320 to engage the deformable portion 308 of the outer skin 106 of the wing 104 with a pressure and/or a force sufficient to adjust the curvature 310 thereof to a desired (e.g., target) curvature. More specifically, the second controller 604 can command the extendible shaft 324 of the second actuator 320 to extend to a desired position (e.g., the extended position 502 of FIG. 5) such that the cap 326 of the second actuator 320 engages the deformable portion 308 of the outer skin 106 of the wing 104 with a pressure and/or a force sufficient to adjust the curvature 310 thereof to a desired (e.g., target) curvature. In implementations of the second actuator 320 wherein the cap 326 is controllably pivotable relative to the extendible shaft 324, the second controller 604 can additionally or alternatively command the cap 326 to pivot (e.g., to rotate) to a desired (e.g., target) position relative to the extendible shaft 324 such that the cap 326 engages the deformable portion 308 of the outer skin 106 of the wing 104 with a pressure and/or a force sufficient to adjust the curvature 310 thereof to a desired (e.g., target) curvature.

In some examples, the command(s) issued by the second controller 604 at block 708 are based on curvature control data received, accessed, processed, and/or generated by the second controller 604, wherein the curvature control data indicates, corresponds to, and/or constitutes a desired (e.g., target) curvature of the deformable portion 308 of the outer skin 106 of the wing 104 of the aircraft 100. In some examples, the second controller 604 receives the curvature control data from the user interface 606 of the droop leading edge control system 600 of FIG. 6. In other examples, the second controller 604 accesses the curvature control data from the memory 608 of the droop leading edge control system 600 of FIG. 6. Following block 708, the method 700 of FIG. 7 proceeds to block 710.

At block 710, the first controller 602, the second controller 604, and/or, more, generally, the droop leading edge control system 600 determines whether to discontinue operating the droop leading edge control system 600. For example, the first controller 602, the second controller 604, and/or, more, generally, the droop leading edge control system 600 can receive one or more command(s) and/or signal(s) from the user interface 606 of FIG. 6 indicating that operation of the droop leading edge control system 600 is to discontinue. In some examples, a failure to receive such operation-discontinuing command(s) and/or signal(s) from the user interface 606 may indicate that operation of the droop leading edge control system 600 is not to discontinue. If the first controller 602, the second controller 604, and/or, more, generally, the droop leading edge control system 600 determine(s) at block 710 that operation of the droop leading edge control system 600 is not to discontinue, the method 700 of FIG. 7 returns to block 702. If the first controller 602, the second controller 604, and/or, more, generally, the droop leading edge control system 600 instead determine(s) at block 710 that operation of the droop leading edge control system 600 is to discontinue, the method 700 of FIG. 7 ends.

From the foregoing, it will be appreciated that the disclosed droop leading edge apparatus and methods advantageously include a deformable outer skin having a leading edge that is movable between a neutral position and a drooped position deflected downward relative to the neutral position. Unlike the conventional aircraft wing high-lift leading edge devices described above that provide discontinuities in the outer mold line of the wing (e.g., when such devices are stowed, and/or when such devices are deployed), the example aircraft wing droop leading edge apparatus and methods disclosed herein advantageously provide for an outer mold line of the wing that is and/or remains continuous (e.g., free of gaps and/or slots) throughout the full range of movement of the leading edge (e.g., between the neutral position and the drooped position).

The continuous outer mold line associated with the disclosed aircraft wing droop leading edge apparatus and methods eliminates a critical source of drag and/or noise associated with the conventional slotted high-lift leading edge devices described above. Consequently, a substantial reduction in the amount of drag on the aircraft is achieved, as is a substantial reduction in the amount of noise within and/or surrounding the aircraft. The reduction in drag advantageously provides a positive economic impact on the operation of the aircraft (e.g., by enabling the aircraft to achieve an improved lift-to-drag ratio and lower fuel burn). The reduction in noise advantageously provides a positive environmental impact on the operation of the aircraft. Additionally, in military applications, the continuous outer mold line associated with the disclosed aircraft wing droop leading edge apparatus and methods provides low observable properties that enhance survivability of the aircraft.

The following paragraphs provide various examples of the examples disclosed herein.

Example 1 includes an aircraft. The aircraft of Example 1 comprises a wing including a front spar and an outer skin covering the front spar. The outer skin has a forward portion located forward of the front spar. The forward portion of the outer skin includes a leading edge movable between a neutral position and a drooped position deflected downward relative to the neutral position. The forward portion of the outer skin has a continuous outer mold line when the leading edge is in the drooped position.

Example 2 includes the aircraft of Example 1, wherein the forward portion of the outer skin includes a topside and an underside located opposite the topside. The leading edge is located between the topside and the underside. The topside includes a deformable portion.

Example 3 includes the aircraft of Example 2, wherein the wing further includes an actuator structured to move the leading edge between the neutral position and the drooped position. The deformable portion expands as the actuator moves the leading edge from the neutral position toward the drooped position.

Example 4 includes the aircraft of Example 3, wherein the actuator is a rotary actuator.

Example 5 includes the aircraft of any of Examples 3-4, wherein the actuator is operatively coupled to the forward portion of the outer skin via a linkage assembly.

Example 6 includes the aircraft of any of Examples 3-5, wherein the aircraft further comprises a controller operatively coupled to the actuator. The controller is structured to control the actuator in association with moving the leading edge between the neutral position and the drooped position.

Example 7 includes the aircraft of Example 3, wherein the wing further includes an actuator structured to adjust a curvature of the deformable portion.

Example 8 includes the aircraft of Example 7, wherein the actuator is a linear actuator including an extendible shaft and a cap coupled to the extendible shaft. The cap is engageable with the deformable portion.

Example 9 includes the aircraft of Example 8, wherein the cap is pivotably coupled to the extendible shaft.

Example 10 includes the aircraft of any of Examples 8-9, wherein extension of the extendible shaft adjusts the curvature of the deformable portion.

Example 11 includes the aircraft of any of Examples 7-10, wherein the aircraft further comprises a controller operatively coupled to the actuator. The controller is structured to control the actuator in association with adjusting the curvature of the deformable portion.

Example 12 includes a method. The method of Example 12 comprises moving a leading edge of a forward portion of an outer skin of a wing of an aircraft between a neutral position and a drooped position deflected downward relative to the neutral position. The outer skin covers a front spar of the wing. The forward portion of the outer skin is located forward of the front spar. The forward portion of the outer skin has a continuous outer mold line when the leading edge is in the drooped position.

Example 13 includes the method of Example 12, wherein the forward portion of the outer skin includes a topside and an underside located opposite the topside. The leading edge is located between the topside and the underside. The topside includes a deformable portion.

Example 14 includes the method of Example 13, wherein moving the leading edge between the neutral position and the droop position includes operating an actuator of the wing. The deformable portion expands as the actuator moves the leading edge from the neutral position toward the drooped position.

Example 15 includes the method of Example 14, wherein the actuator is a rotary actuator.

Example 16 includes the method of any of Examples 14-15, wherein the method further comprises controlling the actuator via a controller of the aircraft in association with moving the leading edge between the neutral position and the droop position.

Example 17 includes the method of Example 13, wherein the method further comprises operating an actuator of the wing to adjust a curvature of the deformable portion.

Example 18 includes the method of Example 17, wherein the actuator is a linear actuator including an extendible shaft and a cap coupled to the extendible shaft. The cap is engageable with the deformable portion.

Example 19 includes the method of Example 18, wherein the method further comprises extending the extendible shaft to adjust the curvature of the deformable portion.

Example 20 includes the method of any of Examples 17-19, wherein the method further comprises controlling the actuator via a controller of the aircraft in association with adjusting the curvature of the deformable portion. The controller is operatively coupled to the actuator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft, comprising:
  a wing including:
    a front spar;
    an outer skin covering the front spar and having a forward portion located forward of the front spar, the forward portion of the outer skin including a topside, an underside located opposite the topside, and a leading edge located between the topside and the underside, the topside including a deformable portion, the leading edge being movable between a neutral position and a drooped position deflected downward relative to the neutral position, the forward portion of the outer skin having a continuous outer mold line when the leading edge is in the drooped position;
    a rotary actuator structured to move the leading edge between the neutral position and the drooped position, wherein the deformable portion expands as the rotary actuator moves the leading edge from the neutral position toward the drooped position; and
    a linear actuator structured to adjust a curvature of the deformable portion.

2. The aircraft of claim 1, wherein the rotary actuator is operatively coupled to the forward portion of the outer skin via a linkage assembly.

3. The aircraft of claim 1, wherein the aircraft further comprises a controller operatively coupled to the rotary actuator, the controller structured to control the rotary actuator in association with moving the leading edge between the neutral position and the drooped position.

4. The aircraft of claim 1, wherein the linear actuator includes an extendible shaft and a cap coupled to the extendible shaft, the cap being engageable with the deformable portion.

5. The aircraft of claim 4, wherein the cap is pivotably coupled to the extendible shaft.

6. The aircraft of claim 4, wherein extension of the extendible shaft adjusts the curvature of the deformable portion.

7. The aircraft of claim 1, wherein the aircraft further comprises a controller operatively coupled to the linear actuator, the controller structured to control the linear actuator in association with adjusting the curvature of the deformable portion.

8. The aircraft of claim 1, wherein the forward portion of the outer skin further includes a hinged portion formed along the underside and located between the leading edge and the front spar.

9. A method, comprising:
  operating a rotary actuator of a wing of an aircraft to move a leading edge of a forward portion of an outer skin of the wing between a neutral position and a drooped position deflected downward relative to the neutral position, the outer skin covering a front spar of the wing, the forward portion of the outer skin being located forward of the front spar, the forward portion of the outer skin having a continuous outer mold line when the leading edge is in the drooped position, the forward portion of the outer skin further including a topside and an underside located opposite the topside, the leading edge located between the topside and the underside, the topside including a deformable portion, wherein the deformable portion expands as the rotary actuator moves the leading edge from the neutral position toward the drooped position; and
  operating a linear actuator of the wing to adjust a curvature of the deformable portion.

10. The method of claim 9, further comprising controlling the rotary actuator via a controller of the aircraft in association with moving the leading edge between the neutral position and the droop position.

11. The method of claim 9, wherein the linear actuator includes an extendible shaft and a cap coupled to the extendible shaft, the cap being engageable with the deformable portion.

12. The method of claim 11, further comprising extending the extendible shaft to adjust the curvature of the deformable portion.

13. The method of claim 11, wherein the cap is pivotably coupled to the extendible shaft.

14. The method of claim 9, further comprising controlling the linear actuator via a controller of the aircraft in association with adjusting the curvature of the deformable portion, the controller being operatively coupled to the linear actuator.

15. The method of claim 9, wherein the forward portion of the outer skin further includes a hinged portion formed along the underside and located between the leading edge and the front spar.

16. An aircraft, comprising:
  a wing including:
    a front spar;
    an outer skin covering the front spar and having a forward portion located forward of the front spar, the forward portion of the outer skin including a topside, an underside located opposite the topside, a leading edge located between the topside and the underside, and a hinged portion located between the leading edge and the front spar, the topside including a deformable portion, the leading edge being movable between a neutral position and a drooped position deflected downward relative to the neutral position, the forward portion of the outer skin having a continuous outer mold line when the leading edge is in the drooped position;
    a first actuator structured to move the leading edge between the neutral position and the drooped position, wherein the deformable portion expands as the first actuator moves the leading edge from the neutral position toward the drooped position; and a second actuator structured to adjust a curvature of the deformable portion.

17. The aircraft of claim 16, wherein the first actuator is a rotary actuator and the second actuator is a linear actuator.

18. The aircraft of claim 17, wherein the linear actuator includes an extendible shaft and a cap coupled to the extendible shaft, the cap being engageable with the deformable portion.

19. The aircraft of claim 18, wherein the cap is pivotably coupled to the extendible shaft.

20. The aircraft of claim 18, wherein extension of the extendible shaft adjusts the curvature of the deformable portion.

21. The aircraft of claim 16, wherein the aircraft further comprises a controller operatively coupled to the first actuator, the controller structured to control the first actuator in association with moving the leading edge between the neutral position and the drooped position.

22. The aircraft of claim 16, wherein the aircraft further comprises a controller operatively coupled to the second actuator, the controller structured to control the second actuator in association with adjusting the curvature of the deformable portion.

* * * * *